Figure 1:
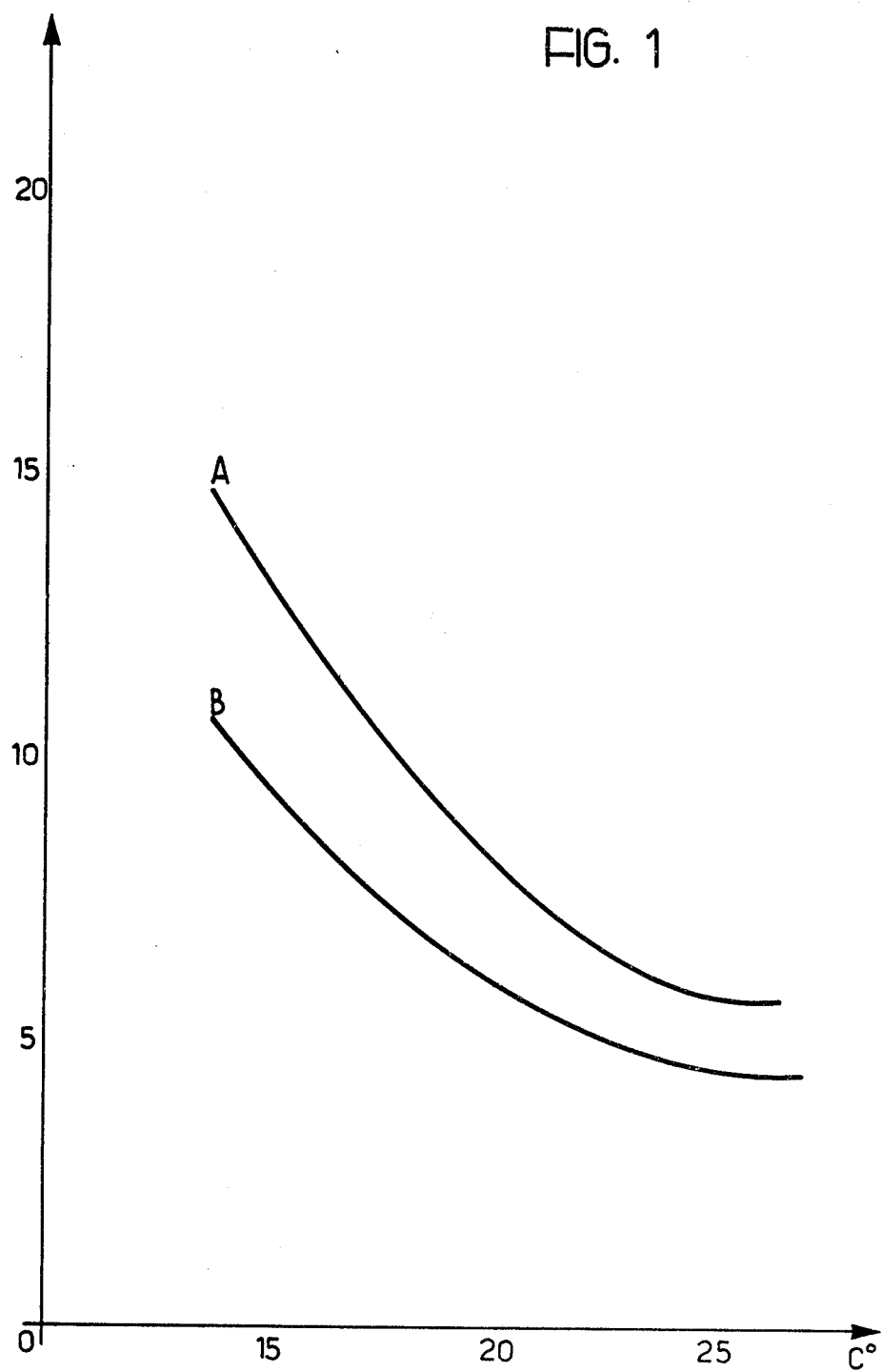

United States Patent [19]

Tavoni

[11] 4,259,864

[45] Apr. 7, 1981

[54] WEATHER MONITORING APPARATUS

[75] Inventor: Gian P. Tavoni, Cambiano, Italy

[73] Assignee: Centro Ricerche Fiat S.p.A., Turin, Italy

[21] Appl. No.: 41,970

[22] Filed: May 23, 1979

[30] Foreign Application Priority Data

Jul. 4, 1978 [IT] Italy .................................. 68565 A/78

[51] Int. Cl.³ ............................................. G01W 1/06
[52] U.S. Cl. ................................... 73/170 R; 47/1 R
[58] Field of Search ...................... 73/170 R; 364/420; 47/1 R

[56] References Cited

U.S. PATENT DOCUMENTS 3,430,217   2/1969   Bridge et al. ..................... 73/170 R

*Primary Examiner*—Jerry W. Myracle

*Attorney, Agent, or Firm*—Sughrue, Rothwell, Mion, Zinn & Macpeak

[57] ABSTRACT

Apparatus for monitoring weather conditions to determine when these can enable the commencement of an infection of mildew, comprising a temperature sensor producing an output signal if the temperature is above a predetermined threshold, a first rainfall sensor producing an output signal when it is not raining, and a second rainfall sensor producing an output signal when a predetermined amount of rain has fallen in a given time; coincidence of the output signals from these sensors is timed and if the coincidence lasts for a predetermined length of time a latch is set indicating that a primary mildew infection can have started. Further progress of the primary infection is monitored using other temperature and humidity sensors. For monitoring secondary mildew infections the second rainfall sensor is replaced by switching in one having a much lower threshold of rainfall, and the coincidence timing interval is changed.

9 Claims, 2 Drawing Figures

WEATHER MONITORING APPARATUS

The present invention relates generally to apparatus for monitoring weather conditions, particularly to apparatus for detecting when the weather conditions are such as to favour the growth of mildew on, for example, vine leaves.

It is known that infections of mildew start from microscopic round bodies called zoospores which are found on fragments of leaves lying on the ground. These zoospores germinate like seeds; for germination it is necessary that the following conditions occur in the order indicated:

(1) the minimum daily temperature must not fall below 10° C. for at least 48 hours, (threshold of air temperature of 10° C. for 48 hours);

(2) there must be sufficient rainfall to saturate the ground thoroughly (threshold of rainfall 10 mm. in 48 hours);

(3) the vine must have started to grow (vine shoot length of 10 cm.)

Once germination has taken place, but before further development has taken place the mildew infection is termed a primary infection.

During each subsequent rain shower the germinated mildew is spread, being carried by the flow of water onto the leaves and stems of the plants. The conditions for further development are as follows:

(1) the mininum daily temperature must not fall below 10° C. (threshold of air temperature of 10° C.); (2) there must be a rainfall or dew of at least 0.1 mm. of water (i.e. the leaves must be soaked by at least 0.1 mm. of rain or dew) and (3) the consequent moisture on the leaf must last for at least an hour from the moment when the rain stops falling because while it is raining the zoospores cannot fix themselves to the stomata, and after the rain has ceased they need at least an hour to insert themselves into the stomata; once this has occurred the infection is termed a secondary infection.

Both in the case of primary infections and in the case of secondary infections it is necessary, to control the mildew, to treat the plants and surrounding area with anticryptogamous agents, but of course some way is required of determining the best moment to take the appropriate action in order to have the greatest effect and reduce the necessity for further treatments.

The technical problem of the present invention is to provide an electronic control device which is able to indicate in a simple way the best moment to effect treatment in order to prevent the further development of mildew; the "best moment" is of course, that at which the treatment will have the most effect and the smallest number of subsequent treatments will be required with evident economy and saving in pollution.

According to the present invention there is provided apparatus for monitoring weather conditions, for detecting conditions favourable to the growth of mildew, characterised in that it includes a temperature sensor which produces an output signal when the temperature is greater than a certain threshold value, a first rainfall sensor which produces an output signal when it is not raining, and a second rainfall sensor which produces an output signal when a predetermined amount of rain has fallen, the outputs of the said three sensors being connected to a coincidence circuit which produces an output signal when all three sensors are producing an output signal, the output signal from the coincidence detector enabling the operation of a timing device which produces an output signal if the coincidental generation of output signals from all three sensors continues for a predetermined time interval set by the timer.

Figure 2:
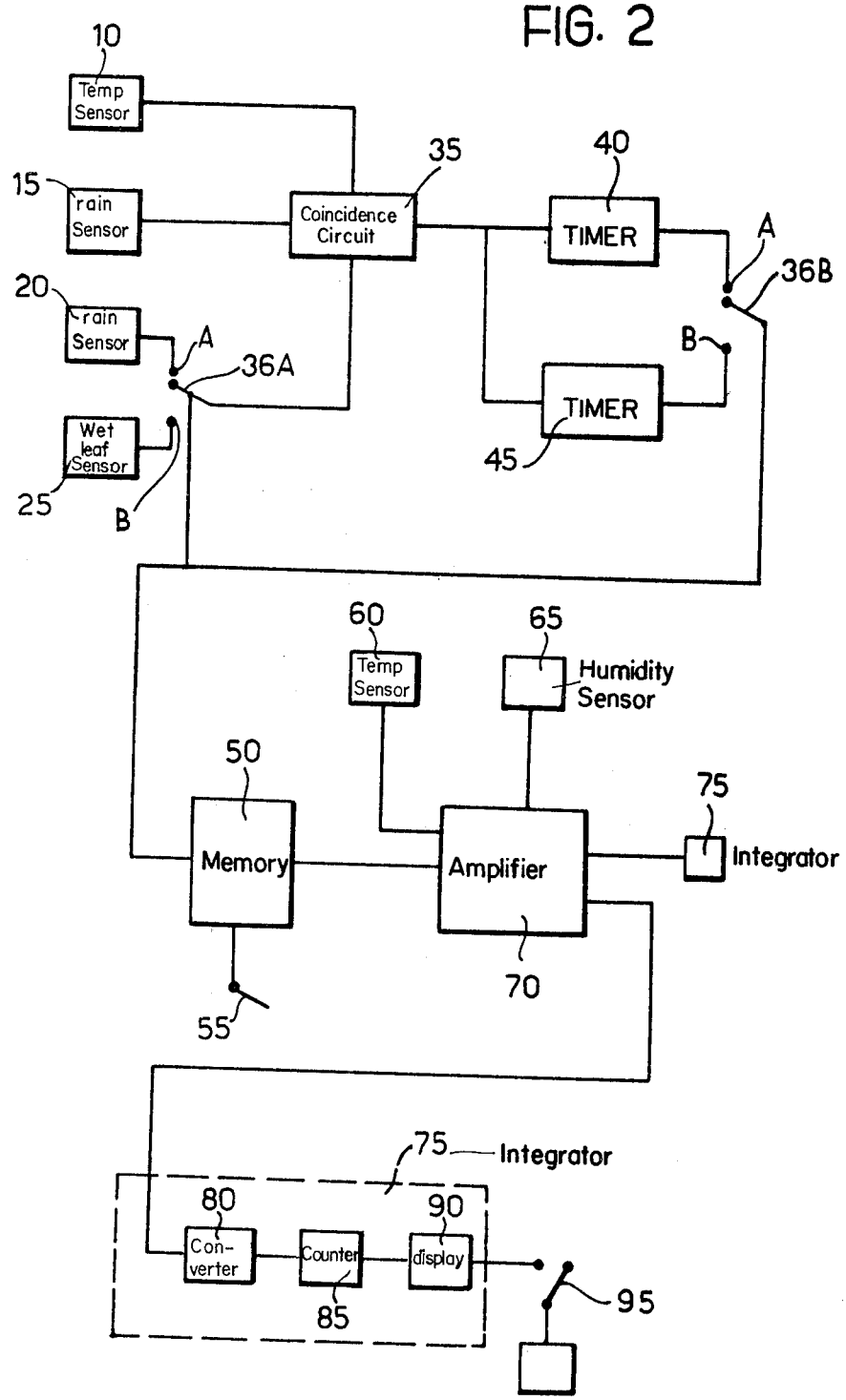

One embodiment of the present invention will now be more particularly described, by way of example, with reference to the accompanying drawings, in which:

FIG. 1 is a graph in which the curves shown illustrate the variation with temperature of time taken for infection to become established for atmospheric humidity less than 60% (curve A), and greater than 60% (curve B), with the ambient temperature in degrees centigrade plotted along the abscissa and the time expressed in days plotted along the ordinate; and FIG. 2 is a block schematic diagram illustrating apparatus forming an embodiment of the present invention, for monitoring the progress of mildew infections in dependence on weather conditions.

Referring now to the drawings, and particularly to FIG. 2, the apparatus shown comprises an array of temperature and rainfall sensors comprising an air temperature sensor 10 constituted, for example, by a bimetal element calibrated at 10° C., a rainfall sensor 15 constituted, for example, by an open ended collector which is arranged to collect water which flows down the outer walls of the apparatus as a whole; within this sensor are disposed two thin conductive plates across which is applied an electric potential whereby to detect the presence of water between the plates; the sensor 15 thus produces an output signal while it is actually raining providing the rainfall represents an amount of atmospheric water greater in quantity than a heavy dew or high humidity: the block 20 is a rainfall sensor having a threshold in the region of 10 mm/m$^2$. This sensor may be constituted for example by a cylindrical collector closed at one end with a removable bottom and a capacity such that when it is filled to a certain level it indicates a rainfall in the region of 10 mm/m$^2$. Finally there is a leaf wetness sensor 25 constituted for example by a small canister of capacity equivalent to a rainfall or dew of 0.2 mm/m$^2$; this sensor also collects water flowing down the outer walls of the apparatus as a whole, two contacts within the canister detect when the water in the canister reaches a level representing a rainfall of 0.2 mm/m$^2$. Alternatively detection of the required water level may be made by a small metal disc having a small insulating hollow separating two metal conductors across which is applied an electric potential. In the event of a heavy dew electrical conduction between the two metal parts can take place due to spanning by the water in the insulating hollow.

The outputs of the sensor 10 and 15 lead directly to a coincidence circuit 35 and the outputs of the detectors 20, 25 lead to a pair of changeover switch contacts 36A which direct the output of either the sensor 20 or the sensor 25 to the coincidence logic circuit 35 in dependence on whether the apparatus is set to detect the occurrance of conditions favouring a primary infection (indicated position A) or a secondary infection (indicated position B).

The output of the coincidence logic circuit 35 passes to a timer 40 and a timer 45 having different timing intervals; the outputs of the timers 40, 45 are connected to the downstream circuits by a second pair of switch contacts 36B linked mechanically to the first switch contacts 36A such as to adopt a position A connecting the timer 40 when the switch 36A is in the position A and to adopt a position B connecting the timer 45 when the switch 36A is in the position B. Thus, when the switches 36A, 36B are in their respective A positions the timer 40 is connected for operation and is started when the coincidence circuit 35 receives outputs from all three sensors 10, 15, 20 to indicate that the temperature is greater than 10° C. (sensor 10), that it is not still raining (sensor 15), and that at least 10 mm/m² of rain has fallen in the past forty-eight hours (sensor 20). Of course the sensor 20 must be emptied regularly in order to avoid a long term accumulation of rain in the bottom of the cannister and this may be achieved automatically by timer means (not shown) or may require human intervention.

If the above specified conditions last for the time set by the timer 40, a signal is passed from the timer 40 to the memory device 50 indicating the commencement of primary infection.

The memory 50 acts simply as a latching device and passes a signal to an amplifier 70 the output of which varies as a function of the ambient temperature which is sensed by a sensor 60 and of the humidity of the air which is sensed by a sensor 65. The varying output from the amplifier 70 is fed to an integrator 75 which keeps account of the advancement of the infection at a variable speed depending on the voltage information from the amplifier 70.

The sensor 60 may be constituted, for example by a thermistor (a temperature sensitive resistor) the resistance of which varies by 2 K ohms per 25° C., whilst the sensor 65 may be a humidity sensor having normally open contacts which close when the humidity exceeds a set intervention value (say 60%).

FIG. 2 also illustrates within the broken outline, an alternative integrator which could be used instead of the electrolytic integrator 75 to perform the same function, but in a digital manner. This is achieved by passing the voltage signal provided by the amplifier 70 to a voltage-to-frequency convertor 80 the output frequency of which is then fed to a counter 85 which keeps count of the impulses from the convertor 80. The total number of pulses is representative of the advancement of the infection and this is displayed on a visual display device 90 which can be normally turned off and enabled by closing a switch 95 operated by the user; this allows a low consumption of electrical energy from the batteries which feed the apparatus.

After the commencement of primary infection has been indicated by the display 90 (or a suitable display, not shown, attached to the integrator 75) the user switches over the switches 36A and 36B to their second position (position B) and the coincidence logic circuit 35 then operates to produce a signal which initiates a timing interval timed by the timer 45, only in the event that the sensor 10 indicates a temperature greater than 10° C., the sensor 15 indicates that it is not still raining, and the sensor 25 indicates the presence of humidity or dew equivalent to a rainfall of about 0.1 mm/m².

If such conditions persist for the time set by the timer 45 (in the region of 1 hour) the memory 50 is fed with a signal indicating the initiation of secondary infection and the progress of the infection is monitored, as in the case of primary infection, by the integrator 75 fed from the variable output amplifier 70. The display device 90 may provide any suitable indication representative of the progress of the infection; for example, it may provide a reading from 0 to 9 representing progress of the infection from 0% to 90%. This may be indicated alternatively by an analogue display on a display device associated with the electrolytic integrator 75. Once the infection has reached 90% the operator will have to effect irrigation with an appropriate disinfectant. At this time zero setting of the memory 50 can be effected by means of an appropriate key 55 so that the apparatus is again in a condition to detect and signal the occurrence of conditions leading to a possible subsequent secondary infection.

What is claimed is:

1. Apparatus for monitoring weather conditions, to detect conditions favorable to the growth of mildew, comprising in combination:
   a temperature sensor operating to produce an output signal whenever the ambient temperature is above a predetermined threshold value,
   a first rainfall sensor operating to produce an output signal when it is not raining,
   a second rainfall sensor operating to produce an output signal when a predetermined amount of rain has fallen,
   a coincidence circuit, the outputs of the three said sensors being connected to three inputs of said coincidence circuit,
   said coincidence circuit operating to produce an output signal when all three said sensors are producing their respective output signals,
   a timing device, the output signal from said coincidence circuit being connected to said timing device whereby the operation of said timing device is enabled while the output signal from said coincidence circuit is being produced, said timing device itself producing an output signal if the coincidental generation of output signals from all three sensors continues for a predetermined time interval set by said timing device.

2. The apparatus of claim 1, wherein there is further provided a latching device,
   the output of said timer is fed to said latching device, the output of said latching device being connected to means for producing a summed output which is dependent on the temperature and humidity conditions occurring subsequent to the generation of said output signal from said timing device.

3. The apparatus of claim 2, wherein said means for producing a summed output dependent on the temperature and humidity conditions comprises:
   an amplifier having two inputs,
   a second temperature sensor having an output connected to one of said inputs and
   a humidity sensor having an output connected to the other of said amplifier inputs and
   an integrator having an input connected to the output of said amplifier.

4. The apparatus of claim 3 wherein the said integrator is constituted by an electrolytic integrator.

5. The apparatus of claim 4 wherein there is further provided a visual display device connected to the output of said integrator.

6. The apparatus of claim 3 wherein said integrator is constituted by a voltage-to-frequency convertor connected to a counter.

7. The apparatus of claim 5, wherein there is further provided a visual display device connected to the output of said integrator.

8. The apparatus of any one of claims 2–7, wherein there is further provided:
   a second timing device, a third rainfall sensor operating to produce an output signal when a second predetermined amount of rain has fallen, and a switching device operating to connect, in one position thereof said second rainfall sensor to said coincidence circuit and said first timing device to said latching device, and in another position thereof said third rainfall sensor to said coincidence circuit and said second timing device to said latching device whereby to detect, when in said one position, conditions favourable to a primary infection of mildew and, when in said other position, conditions favourable to a secondary infection of mildew.

9. The apparatus of claim 7, wherein said switching device comprises:

a first set of changeover switch contacts connected between said second and said third rainfall sensors and said coincidence circuit, and a second set of changeover switch contacts connected between said first and said second timing devices and said latching device, the movable elements of the two said sets of changeover switch contacts being linked for movement together.

* * * * *